Oct. 28, 1952 D. O. FERRIS 2,615,233
HYDRAULICALLY ADJUSTABLE TOOL POST
Filed May 4, 1950
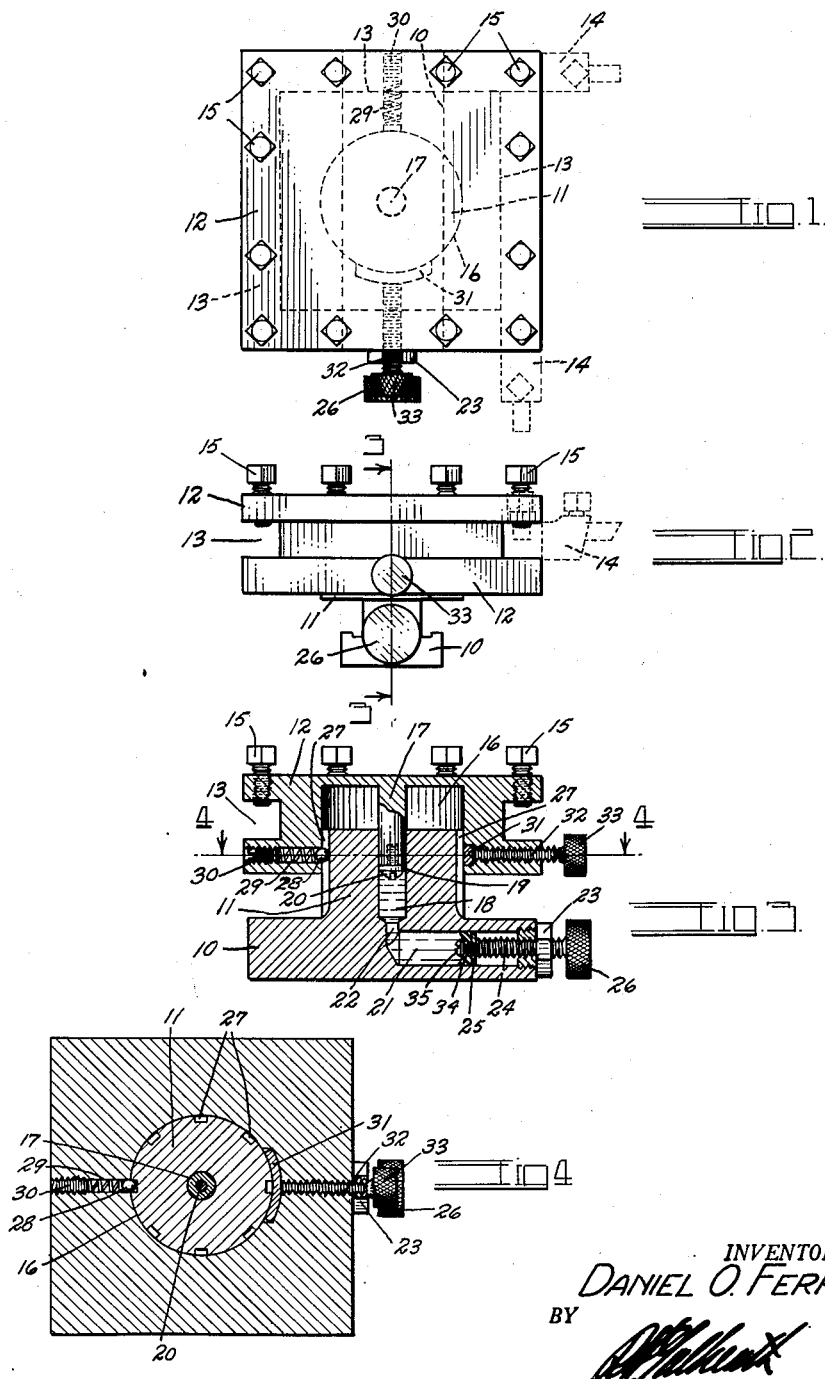
INVENTOR.
DANIEL O. FERRIS
BY
ATTORNEY Patented Oct. 28, 1952

2,615,233

UNITED STATES PATENT OFFICE 2,615,233

HYDRAULICALLY ADJUSTABLE TOOL POST

Daniel O. Ferris, Denver, Colo.

Application May 4, 1950, Serial No. 160,036

5 Claims. (Cl. 29—48)

This invention relates to a tool post for lathes and similar machine tools, and has for its principal object the provision of a multiple-tool supporting post which can be raised and lowered hydraulically to accurately position the tool at any desired height.

Another object is to incorporate the hydraulic pressure device in the tool post itself so that the hydraulic mechanism may be actuated by simply rotating an adjusting screw so that all outside hydraulic connections will be eliminated.

A further object is to provide a multiple-tool holding post with position-indicating means to indicate and set the tools at predetermined radial positions, and to so construct the device that it may be used in the post slide of any conventional lathe.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a plan view of the improved tool post;

Fig. 2 is a side view thereof;

Fig. 3 is a longitudinal section, taken on the line 3—3, Fig. 2; and

Fig. 4 is a horizontal section, taken on the line 4—4, Fig. 3.

The improved tool post is provided with a dovetailed, elongated foot portion 10 designed to fit into the tool slide of any conventional lathe. The foot 10 could, of course, be clamped to a milling machine or drill press table or other machine tool.

The elongated foot portion 10 supports an upstanding cylindrical post 11 which is rotatably and slidably fitted into a cylindrical socket 16 in a tool-holding block 12. The tool-holding block 12 is preferably rectangular, as illustrated, and is provided with a tool-receiving channel 13 along each of its sides. The channels 13 are designed to receive various lathe tools, such as indicated at 14, which are held in place in the channels by means of suitable set screws 15.

A plunger 17 is formed on or affixed to the block 12 at the axis of the socket 16 so as to extend downwardly into a hydraulic bore 18 formed in the post 11. The lower extremity of the plunger 17 is provided with a suitable sealing gasket 19 held in place by means of an attachment screw 20.

One extremity of the foot portion 10 is drilled out to form a fluid pressure cylinder 21 which communicates with the bore 18 through a transfer port 22. The outer extremity of the cylinder 21 is closed by means of a threaded bushing 23. A threaded piston screw 24 is screwed through the bushing 23 and terminates within the cylinder in a piston plate 25 against which a cup-washer 34 is clamped by means of a central screw 35. The outer extremity of the piston screw 24 terminates in a knurled head 26.

The bore 18, the passage 22, and the cylinder 21 are maintained filled with suitable hydraulic fluid. It can be seen that when the knurled head 26 is rotated in one direction, it will force the piston plate 25 inwardly, and the latter will in turn force the fluid into the bore 18, causing it to lift the plunger 17 and the entire tool-holding block 12.

By proportioning the relative sizes of the cylinder 21 and the bore 18, any desired ratio may be obtained between the degree of rotation of the head 26 and the rise of the block 12, so that an accurate micrometric adjustment may be obtained.

The sides of the post 11 are vertically grooved, as indicated at 27, the spacing of the grooves being at any desired regular intervals to indicate radial positions of any degree. As illustrated, the grooves are positioned at 45° intervals. A click ball 28 is forced into the grooves 27 by means of a click spring 29 acting against a threaded plug 30 in the block 12. Thus, the block 12 can be rotated and will automatically position itself at 45° intervals.

The block can be locked to the post 11 at any desired height or angle through the medium of a brake shoe 31 which can be forced against the side of the block by means of a locking screw 32 threaded into the block. The screw 32 terminates exteriorly in an actuating head 33. By tightening the screw 32, the shoe 31 is forced against the side of the post 11 to prevent vertical or circumferential movement of the block 12.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A tool post for lathes and the like comprising: a foot member arranged for attachment to the tool rest of a lathe; a cylindrical post mounted on and arising from said foot member; a tool-holding block fitted over said post and having a cavity in its bottom for receiving said post; a plunger affixed to said block extending downward from said block into a receiving bore in said post; said plunger being free to move either axially or circumferentially of said bore; a hydraulic cylinder formed in said foot portion and communicating with said bore; a pump piston in said cylinder; hydraulic fluid in said bore and cylinder; and means for forcing said piston inwardly to cause said fluid to force said plunger upwardly to raise said block.

2. A tool post for lathes and the like comprising: a foot member arranged for attachment to the tool rest of a lathe; a cylindrical post mounted on and arising from said foot member; a tool-holding block fitted over said post and having a cavity in its bottom for receiving said post; a plunger affixed to said block extending downward from said block into a receiving bore in said post; said plunger being free to move either axially or circumferentially of said bore; a hydraulic cylinder formed in said foot portion and communicating with said bore; a pump piston in said cylinder; hydraulic fluid in said bore and cylinder; and a piston screw extending into said cylinder and being connected with said piston so that when said screw is rotated in one direction, said piston will be forced inwardly to cause said fluid to force said block upwardly.

3. A tool post for lathes and the like comprising: a foot member arranged for attachment to the tool rest of a lathe; a cylindrical post mounted on and arising from said foot member; a tool-holding block fitted over said post and having a cavity in its bottom for receiving said post; a plunger affixed to said block extending downward from said block into a receiving bore in said post, said plunger being free to move either axially or circumferentially of said bore; a hydraulic cylinder formed in said foot portion and communicating with said bore; a bushing threaded into said foot member and closing the outer extremity of said cylinder; a piston rod threaded through said bushing; a piston mounted on the inner extermity of said rod within said cylinder; and means for rotating said rod to cause said piston to force said fluid into said bore to raise said block.

4. A tool post for lathes and the like comprising: a foot member arranged for attachment to the tool rest of a lathe; a cylindrical post mounted on and arising from said foot member; a tool-holding block fitted over said post and having a cavity in its bottom for receiving said post; a plunger affixed to said block extending downward from said block into an axially positioned receiving bore in said post, said plunger being free to move either axially or circumferentially of said bore; a hydraulic cylinder formed in said foot portion and communicating with said bore; a pump piston in said cylinder; hydraulic fluid in said bore and cylinder; means for forcing said piston inwardly to cause said fluid to force said plunger upwardly to raise said block; a brake shoe in said block positioned to engage said post; and screw means contacting said brake shoe for forcing the latter against said post.

5. A tool post for lathes and the like comprising: a foot member arranged for attachment to the tool rest of a lathe; a cylindrical post mounted on and arising from said foot member; a tool-holding block fitted over said post and having a cavity in its bottom for receiving said post; a plunger affixed to said block extending downward from said block into an axially positioned receiving bore in said post, said plunger being free to move either axially or circumferentially of said bore; a hydraulic cylinder formed in said foot portion and communicating with said bore; a pump piston in said cylinder; hydraulic fluid in said bore and cylinder; means for forcing said piston inwardly to cause said fluid to force said plunger upwardly to raise said block; vertical spaced-apart grooves formed in the sides of said post; and a spring-actuated click ball positioned to successively engage said grooves as said block is rotated about said post.

DANIEL O. FERRIS.

REFERENCES CITED

The following references are of record in the file of this patent:

UNITED STATES PATENTS

| Number | Name | Date |
| --- | --- | --- |
| 1,143,252 | Conradson | June 15, 1915 |
| 1,250,490 | Newmann | Dec. 18, 1917 |
| 2,244,185 | Bakewell | June 3, 1941 |
| 2,344,509 | Guenther | Mar. 21, 1944 |
| 2,526,617 | Colsen | Oct. 21, 1950 |
| 2,527,871 | Bakewell | Oct. 31, 1950 |